(12) United States Patent
Shinar et al.

(10) Patent No.: US 10,883,509 B2
(45) Date of Patent: Jan. 5, 2021

(54) SMART CEILING FAN, AND ITS METHOD OF OPERATION

(71) Applicant: OLIBRA LLC, Cresskill, NJ (US)

(72) Inventors: Zohar Shinar, Demarest, NJ (US); Christopher Andrew Merck, Sussex, NJ (US)

(73) Assignee: OLIBRA LLC, Cresskill, NJ (US)

( * ) Notice: Subject to any disclaimer, the term of this patent is extended or adjusted under 35 U.S.C. 154(b) by 127 days.

(21) Appl. No.: 16/416,220

(22) Filed: May 19, 2019

(65) Prior Publication Data

US 2020/0362869 A1 Nov. 19, 2020

(51) Int. Cl.
*F04D 25/08* (2006.01)
*F04D 27/00* (2006.01)

(52) U.S. Cl.
CPC .......... *F04D 27/004* (2013.01); *F04D 25/08* (2013.01); *F04D 25/088* (2013.01); *F05D 2270/02* (2013.01); *F05D 2270/03* (2013.01)

(58) Field of Classification Search
CPC ...... F04D 25/08; F04D 25/088; F04D 27/004; F05D 2270/02; F05D 2270/03; F05D 2270/54
See application file for complete search history.

(56) References Cited

U.S. PATENT DOCUMENTS

| | | | | |
|---|---|---|---|---|
| 5,847,526 A | * | 12/1998 | Lasko | H02P 27/16 318/471 |
| 6,120,262 A | * | 9/2000 | McDonough | H05B 47/19 417/424.1 |
| 2003/0225480 A1 | * | 12/2003 | Liu | F24F 7/007 700/276 |
| 2018/0372108 A1 | * | 12/2018 | Liu | F24F 11/30 |

* cited by examiner

*Primary Examiner* — Ninh H. Nguyen
(74) *Attorney, Agent, or Firm* — Eitan Mehulal Sadot

(57) ABSTRACT

Smart ceiling fan, and its method of operation. A fan includes an electric rotor to rotate a set of blades at a rotation speed. A controller operates to enforce a modification to rotation speed of the set of blades, based on a first user-configurable parameter of average rotation speed to be maintained, and further based on a second user-configurable parameter of level of variance of rotation speed; and optionally, also based on a third user-configurable parameter of length of time-interval between two consecutive modifications of rotation speed of the set of blades. The fan operates to automatically emulate a naturally-occurring breeze-like airflow.

20 Claims, 2 Drawing Sheets

SMART CEILING FAN, AND ITS METHOD OF OPERATION

FIELD

Some embodiments relate to the field of fans and ceiling fans.

BACKGROUND

A fan is a machine used to create a flow of air, by revolving an arrangement of blades which move or push the surrounding air. In some fans, the blades are contained in a housing, to increase safety by preventing objects or human hands from contacting the blades of the fan.

A ceiling fan is a fan mounted on the ceiling of a room or otherwise suspended from the ceiling of a room. A ceiling fan is typically electrically powered, and operates to circulate the air in such room.

SUMMARY

The present invention provides a smart ceiling fan, as well as its method of operation. Particularly, some embodiments of the present invention include a fan or a ceiling fan or a smart (Internet-connected, cloud-platform connected) fan or ceiling fan, featuring a user-customizable or user-modifiable or user-configurable simulated or emulated natural breeze or non-fixed breeze or non-constant breeze or ever-changing breeze or dynamically-changing breeze.

In some embodiments, a fan includes an electric rotor to rotate a set of blades at a rotation speed. A controller operates to enforce a modification to rotation speed of the set of blades, based on a first user-configurable parameter of average rotation speed to be maintained, and further based on a second user-configurable parameter of level of variance of rotation speed; and optionally, also based on a third user-configurable parameter of length of time-interval between two consecutive modifications of rotation speed of the set of blades. The fan operates to automatically emulate a naturally-occurring breeze-like airflow.

DETAILED DESCRIPTION OF SOME DEMONSTRATIVE EMBODIMENTS OF THE PRESENT INVENTION

Figure 1:
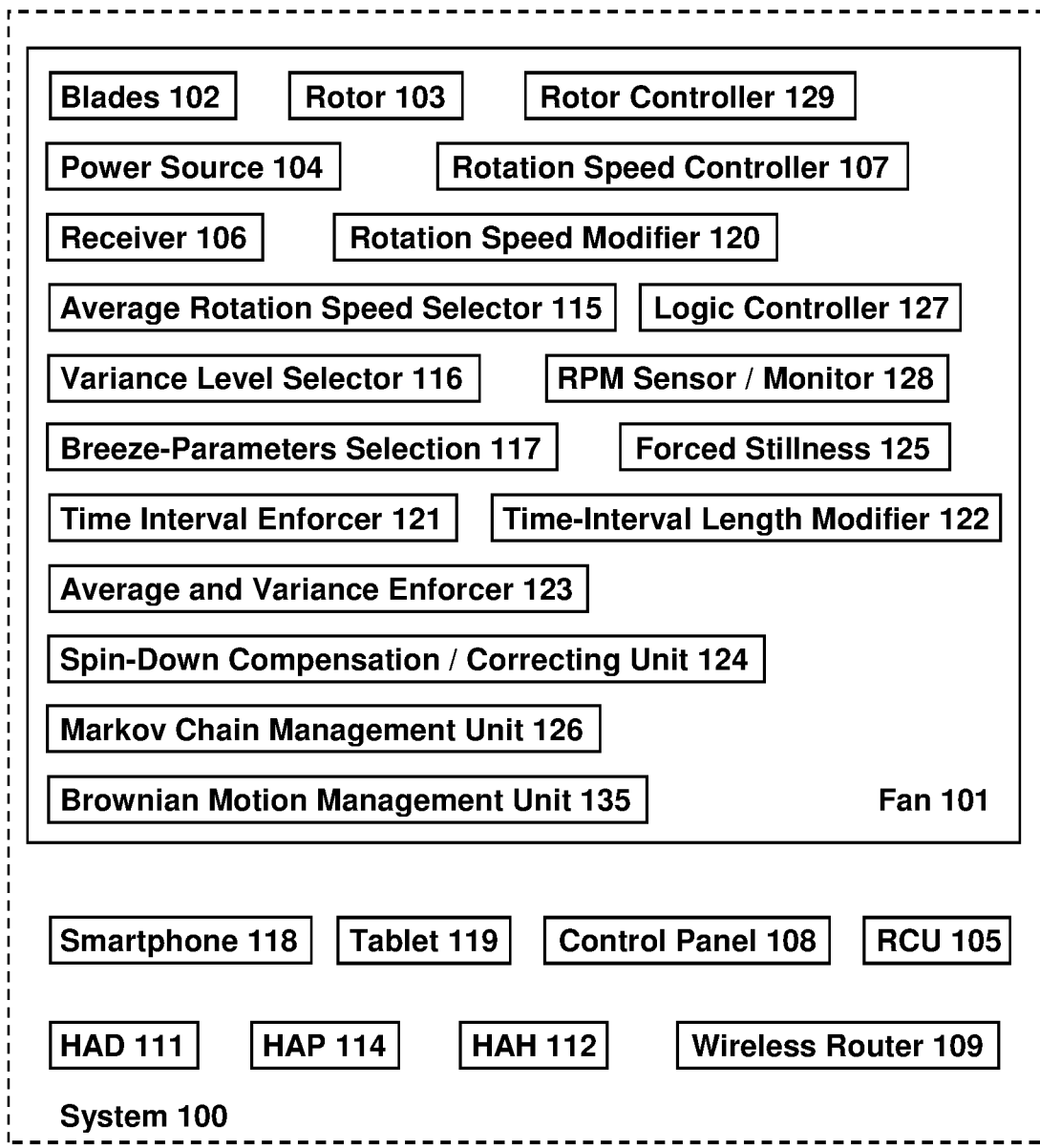
FIG. 1 is a block diagram illustration of a system, in accordance with some demonstrative embodiments of the present invention.

The Applicants have realized that conventional fans and ceiling fans generate a flow of air at a constant speed, which feels artificial and may be irritating for some user, unlike a naturally occurring wind or natural breeze which dynamically and naturally changes its air-flow speed.

The Applicants have realized that a conventional ceiling fan revolves at a fixed speed, which may cause fatigue or irritation to some users, and/or may cause a feeling of artificial and non-natural breeze generated by such ceiling fan, and/or may cause some users to perceive the air movement as artificial and/or irritating and/or distracting and/or burdening.

The Applicants have realized that this problem is not solved by providing a ceiling fan with two or three pre-defied rotation speeds (e.g., low speed, medium speed, high speed): once the user selects a particular rotation speed, the ceiling fan proceeds to operate at this fixed rotation speed until the user manually changes the speed, thereby continuing to provide artificial and fixed and non-natural breeze for long periods of time.

The present invention includes a fan or a ceiling fan able to provide a more comfortable experience to the user, solving and/or mitigating and/or reducing the problem in which the fan's air movement is perceived as artificial, and/or alleviating the fatigue experienced by some users when being located in a room with continuous and fixed airflow rather than intermittent airflow or dynamically-changing, and/or while conforming to individual user needs through customization of such fan-generated breeze.

The Applicants have realized that a small subset of conventional ceiling fans, such as some conventional ceiling fans manufactured by "Big Ass Fans" of Lexington, Ky., USA, may provide a "Whoosh" mode in which the ceiling fan switches at pre-defined time-intervals among pre-defined rotation speeds; for example, rotating for 60 seconds at low speed, then rotating for 60 seconds at high speed, then rotating for 60 seconds at medium speed, and so forth. Additionally, some conventional fans may randomly switch between multiple rotation speed, every minute or two. However, the Applicants have realized that such conventional implementations do not solve the above-described problems: firstly, during each such time-interval, the speed of rotation remains fixed and still causes irritation or fatigue to some users; secondly, the repeating patterns are often predictable by users and/or are still tiring for some users and/or are still perceived by some user as generally-fixed artificial breeze or as non-natural breeze; thirdly, even an injection of random changing of speeds is not sufficient for some users, since within each time-interval the fan maintains a constant rotation speed for at least a minute or two and thus produces artificial non-natural breeze for such time period.

The Applicants have realized that some users may benefit from a fan or a ceiling fan or a smart fan or a smart ceiling fan, which features a fully user-customizable or user-programmable or user-defined or user-configurable speed of airflow or rotation speed or revolving speed or dynamically-changing breeze, which would resemble naturally-occurring breeze and would not be perceived by some users as a constant or non-changing artificial breeze.

The fan of the present invention provides full and flexible user-customization. While conventional fans feature a binary option (rotate or not-rotate), or a fixed list of 3 or 4 options (e.g., turned off; low speed; medium speed; high speed), the present invention enables a user to customize a breeze of a ceiling fan from a range of hundreds or thousands of possible permutations, which may optionally be presented or represented or indicated or selected via a two-dimensional space of options (e.g., array, matrix, circular user interface, two-axis user interface, or the like). Optionally, a color-wheel design may be used, for selecting or defining a breeze setting. A two-parameter or bi-parameter or dual-parameter breeze control algorithm, which is used by the present invention, provides a more natural breeze, relative to the pre-defined patterns or even randomly-changing speeds that a conventional ceiling fan may provide.

The present invention may further enable energy saving, and/or reduced power consumption and/or reduced electricity costs, by providing a natural breeze or a simulated natural breeze or an emulated natural breeze via a dynamically-changing and user-customizable rotation speed, in a manner that saves energy and costs relative to revolving the blades of the fan at the same fixed speed or even at pre-defined time-slots of fixed rotation speeds.

Reference is made to FIG. 1, which is a schematic block-diagram illustration of a system 100, in accordance with some demonstrative embodiments of the present invention. System 100 comprises a fan 101, which may be a ceiling fan or a ceiling-mounted fan or a ceiling-suspended fan; or may be a stand-alone fan, a table-top fan, a portable fan which may be placed on the floor or on a shelf or on a table, or the like. Fan 101 comprises a set of blades 102 that can revolve or rotate or spin by an electric rotor 103 or a similar motor or engine, which is electrically powered via a power source 104 (e.g., connection to a mains power outlet or a wall power outlet).

A rotation speed controller 107 may be comprised in rotor 103, or may be coupled to it or associated with it, or may otherwise be connected; and may regulate or control or modify or set or define the current rotation speed of the blades 102 as caused by the rotor 103. In some embodiments, the rotation speed controller may utilize several pre-defined rotation speed values that the user may select among; for example, a low rotation speed, a medium rotation speed, and a high rotation speed, as well as a "zero" rotation speed which corresponds to no rotor-based rotation at all (e.g., causing the blades to slow down their rotation speed due to air friction until the blades come to a complete stop).

Fan 101 may be controlled via a wired or wireless control panel 108, such as, a set of one or more user interface (UI) elements, e.g., buttons, sliders, rotating wheel or rotating dial, on-off buttons, push buttons, or the like; or a Graphical UI (GUI) via a touch-screen or multi-touch screen interface. Such wired control panel may be installed on a wall, typically in the same room or in the same venue of the fan 101 itself, and may provide command signals over a wire or cable.

Additionally or alternatively, fan 101 may be controlled via a remote-control unit (RCU) 105, which may communicate wirelessly over a wireless communication link with a wireless communication receiver 106 in fan 101. For example, RCU 105 may generate and transmit Radio Frequency (RD) signals and/or Infra-Red (IR) signals towards fan 101, and such signals are wirelessly received by the receiver 106 of fan 101. In some embodiments, optionally, receiver 106 may be implemented as a part of a wireless transceiver or as part of a transmitter-receiver unit, to enable bi-directional wireless communication between the fan 101 and the RCU 106; although in other embodiments, such communication may be uni-directional from the RCU 106 towards the fan 101, and no transmitting capability may be required of fan 101.

In some embodiments, commands or signals may be conveyed directly from the portable RCU 105 to the receiver 106 in fan 101; for example, over a direct wireless communication link (e.g., direct RF signal; direct IR signal; direct Bluetooth signal; direct point-to-point Wi-Fi signal), such that the wireless communication signal is generated within the RCU 105 and travels locally through the air of the room or venue and is received wirelessly directly at the receiver 106 of the fan 101. Additionally or alternatively, commands or signals may travel indirectly from the portable RCU 105 to the receiver 106 of fan 101. For example, receiver 106 may be an IEEE 802.11 receiver (or transceiver) or a Wi-Fi receiver (or transceiver) that is connected to a wireless router 109 in that home or venue, and RCU 106 may similarly comprise a Wi-Fi transceiver, thereby enabling the RCU 105 and the fan 101 to communicate indirectly via the wireless router 109.

Additionally or alternatively, such indirect wireless communication between the RCU 105 and the fan 101 may be enabled or facilitated by a Home Automation Device (HAD) 111 or by a Home Automation Hub (HAH) 112, such as an Amazon Echo unit powered by a virtual assistant (e.g., Amazon Alexa, or Apple Siri, or Samsung Bixby, or the like). In some embodiments, a user may control the fan 101 and its operational settings by speaking or by uttering a voice command (e.g., "change fan speed to high", or "stop the ceiling fan"); the voice is captured or recorded or acquired by a microphone of such HAD 111 or HAH 112, which performs speech-to-text conversion or speech recognition (SR) or otherwise extracts or identifies or recognizes the command, and then generates and transmits a wireless communication signal to the fan 101 indicating such command, or alternatively triggers another device in that venue (e.g., triggers the RCU 105, or a smartphone or tablet in that venue) to generate and transmit such wireless communication signal to the fan 101 indicating such command. In some embodiments, optionally, a command to modify an operational setting of the fan 101 may travel through the Internet or via a cloud-based platform; for example, from the RCU 105 to a home automation device or hub, which in turn utilizes Internet or cloud-based processing (e.g., for speech recognition) and/or other mechanism of cloud-based or Internet-based fulfillment of the conveyed command (e.g., if the fan 101 itself is by itself an Internet-connected fan).

In some embodiments, fan 101 may be in communication, directly and/or indirectly, with a remote or cloud-based Home Automation Platform (HAP) 114, which enables a home-owner or a tenant or a venue-owner or other user to register one or more Internet-connected devices or appliances (e.g., ceiling fan; smoke detector; CO detector; security camera; smart doorbell) and to make them associated with a single HAP account, which then enables such user to remotely control, via an Internet-connected device (e.g., smartphone, tablet, computer, smart-watch) those registered Internet-connected devices or appliances from within a central location, and/or enables the user to track or monitor their current operational status, to selectively modify their operational settings, to selectively turn them on and off, to view data that is collected by such devices (e.g., to view a current CO measurement; to view image footage or video footage acquired by a security camera or a smart doorbell), and/or to otherwise remotely manage such Internet-connected devices.

In some embodiments, RCU 105 may be implemented as a stand-alone device or a dedicated device that is able to control only the specific fan 101. In other embodiments, RCU 105 is implemented as a functionality or unit or module or "app" or application in (or of) another electronic device, such as a smartphone or tablet or smart-watch. In still other embodiments, fan 101 may be controlled via two or more different control units; for example, (i) via a wall-based control panel, and/or (ii) via an "original" or "proprietary" portable RCU which can control only this specific fan 101, and/or (iii) via one or more smartphones or tablets or other electronic devices that are able to present a GUI that a user can engage with, and that are able to generate and transmit a wireless signal (e.g., RF, or IR, or Wi-Fi, or BlueTooth, or the like) which may be received and/or processed by fan 101 directly and/or indirectly via other devices (e.g., the HAD or HAH or the wireless router).

The natural breeze simulation or the natural breeze emulation, or the user-customized breeze, in accordance with the present invention, may be implemented in any of the above-mentioned types of fans, which may be controlled by any one or any combination of the controls means that are described above; regardless if the fan 101 is currently Internet-connected or is not Internet-connected.

In accordance with the present invention, the user may select a "breeze" mode, through the wall-based control panel or through the dedicated RCU or through a general-purpose RCU, or through a mobile device (smartphone, tablet, smartwatch) that operates as an RCU for fan 101. Upon such selection, the user is presented with a UI or a GUI that enables the user to define a customized breeze, by defining or selecting or indicating values of two parameters: the Average speed of rotation of the blades, and the level of Variance of the speed of rotation relative to such average speed. In some embodiments, the user may perform such selection through a matrix or array or table having rows and columns (e.g., "average speed of 3 out of 10, and variance of 8 out of 10"; or, "average speed of 7 out of 10, and variance of 2 out of 10"); or by moving sliders or engaging with buttons, or by dragging or moving physical sliders or on-screen sliders that correspond to those parameters; or by selecting or tapping or clicking on a two-dimensional representation (e.g., a graph, a chart, a circle, a map) having a two-axis structure that corresponds to these two parameters. In a demonstrative embodiment, the GUI may be a color-coded GUI, or symbol-coded interface, and/or may include words or adjectives that describe various types of naturally occurring airflow conditions (e.g., windy, stormy, gusty, breeze, steady, or the like).

Reference is made to Table 1, which demonstrates a two-dimensional UI implemented as a demonstrative matrix or array, enabling a user to separately configure the desired Average parameter value and the desired Variance parameter value for the controlled fan:

TABLE 1

|  | Average Speed = 0 | Average Speed = 1 | Average Speed = 2 | Average Speed = 3 | Average Speed = 4 | Average Speed = 5 |
| --- | --- | --- | --- | --- | --- | --- |
| Var = 0 | Z | F1 | F2 | F3 | F4 | F5 |
| Var = 1 | K1 | P1 |  | P4 |  | P6 |
| Var = 2 | K2 |  |  |  |  |  |
| Var = 3 | K3 | P2 |  |  |  |  |
| Var = 4 | K4 |  |  | P5 |  |  |
| Var = 5 | K5 | P3 |  |  |  | P7 |

For example, if the user chooses or taps or clicks on table-location P1, then the average speed of rotation of the blades is the lowest speed (other than the zero non-rotation value), and the variance level exists but is relatively small (1 out of 5).

If the user chooses or taps or clicks on table-location P2, then the average speed of rotation of the blades is still low (1 out of 5), yet the variance level is now medium (3 out of 5) indicating that the speed may dynamically change to emulate sudden "rapid gusts", which may cause the speed to sometimes peak from average level 1 to level 2 or to level 3 (out of 5).

If the user chooses or taps or clicks on table-location P3, then the average speed of rotation of the blades is still low (1 out of 5), yet the variance level is maximal (5 out of 5), thereby allowing the blades to suddenly rotate (for short periods of time) at high rotation speed (e.g., 4 or even 5 out of 5), while still maintaining a general average rotation speed of "1 out of 5".

If the user chooses or taps or clicks on table-location P4, then the average speed of rotation of the blades is medium (3 out of 5), and the variance level is low (1 out of 5).

If the user chooses or taps or clicks on table-location P5, then the average speed of rotation of the blades is high medium (3 out of 5), yet the variance level is now relatively high (4 out of 5), enabling harder or faster "gusts" of wind by temporarily revolving the blades more rapidly, as well as more slowly for tranquility periods.

If the user chooses or taps or clicks on table-location P6, then the average speed of rotation of the blades is high (5 out of 5), and the variance level is low (1 out of 5); for example, in certain time-slots, which may be random or pre-defined, the speed may be reduced to 4 out of 5, and possibly to 3 out of 5, but not to 2 out of 5 and not to 1 out of 5.

If the user chooses or taps or clicks on table-location P7, then the average speed of rotation of the blades is high (5 out of 5), and the variance level is high (5 out of 5); for example, in certain time-slots, which may be random or pre-defined, the speed may be reduced to 4 out of 5, or to 3 out of 5, or to 2 out of 5, or to 1 out of 5, and possibly even to a rotor rotation speed of zero for a short time-slot (e.g., 10 or 20 seconds, in which the blades slow-down dur to air friction but do not necessarily reach a complete stop).

Table-locations F1 through F5 correspond, respectively, to five fixed rotation speeds 1 through 5 (out of 5), with a speed variance of zero.

Table-locations K1 through K5 correspond, respectively, to an average rotation speed of zero, yet still enabling momentary or timed rotation at different variance levels, ranging from little variance (K1) to gusty and sudden changes (K5).

Table-location Z corresponds to deactivation of the rotor, such that the rotor does not provide any spinning power to the blades, which eventually (e.g., within one minute) slow down and come to a complete stop due to air friction.

For demonstrative purposes, Table 1 is a 6 by 6 able, with a range of 0 to 5 for each parameter; however, other scales or values or ranges may be used, and the range for the Average values need not be the same range as the range for the Variance parameter. For example, in some embodiments, the range for Average speed may be from 0 to 10, whereas the range for Variance may be simplified into four values such as "0" (no variance; fixed speed) or "1" (low variance) or "2" (medium variance) or "3" (high variance). Other suitable scales or ranges may be used.

Figure 2:
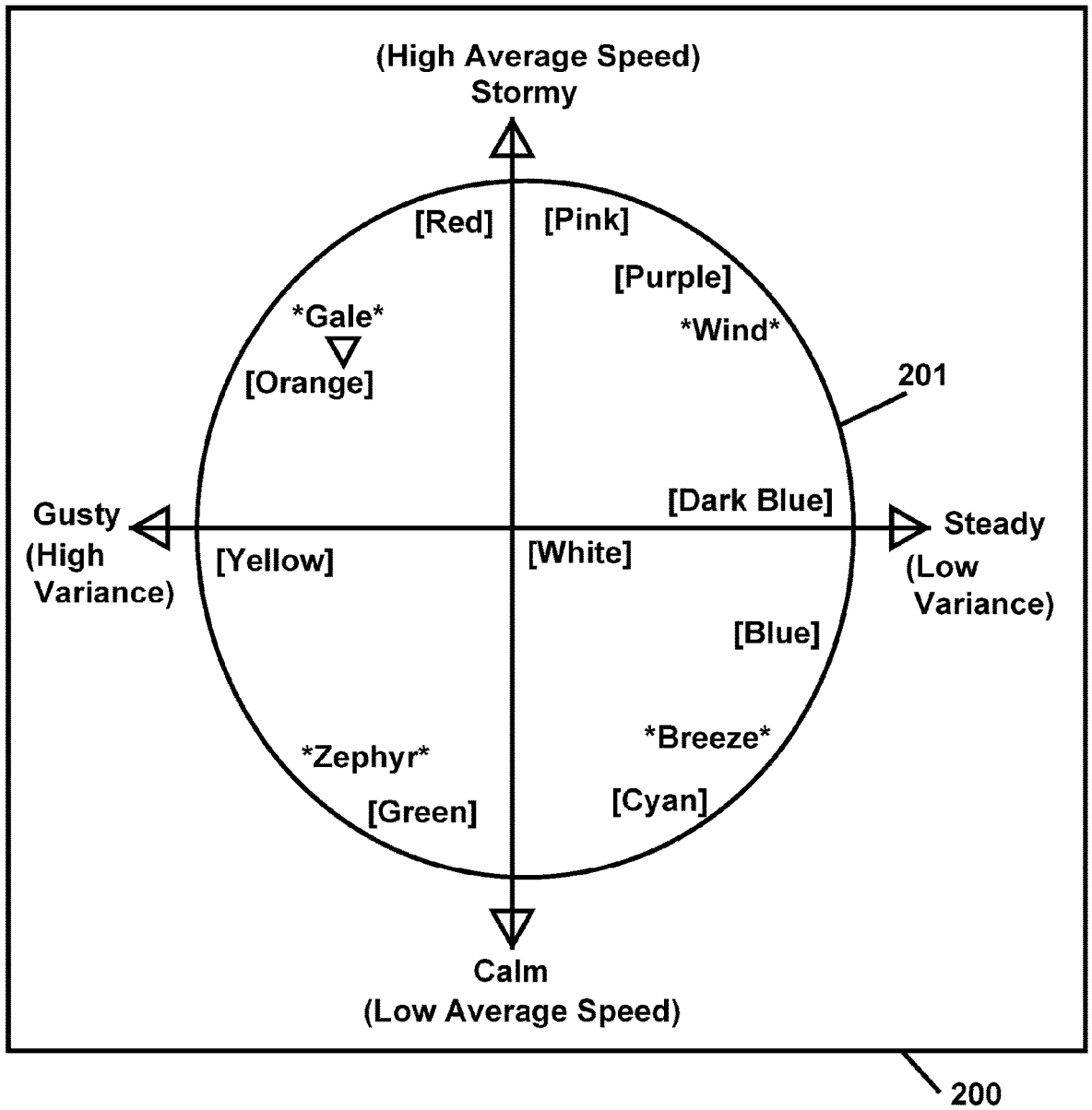
FIG. 2 is a schematic illustration of a control unit having a Graphical User Interface (GUI) for customizing and controlling the breeze or airflow created by a fan, in accordance with some demonstrative embodiments of the present invention

Reference is made to FIG. 2, which is a schematic illustration of a control unit 200 having a GUI 201 for customizing and controlling the breeze or airflow created by a fan, in accordance with some demonstrative embodiments of the present invention. Control unit 200 may be wall-mounted, or may be portable or hand-held; or may be a dedicated RCU device that is able to control only one particular fan; or may be implemented as a functionality of a smartphone or tablet or smart-watch or other electronic device or appliance or gadget. Similarly, GUI 201 may be implemented a touch-screen interface, or via other tactile interface (e.g., touch-pad).

For demonstrative purposes, there is shown a horizontal axis indicating the parameter of Variance, with the range indicated by adjectives "Gusty" for high variance or "Steady" for low variance. Similarly, there is shown a vertical axis indicating the parameter of Average Speed, with the range indicated by adjectives "Calm" for low-speed or "Stormy" for high-speed. In some embodiments, the two arrows or axes need not necessarily be shown to the user; and a color-picker interface may be used. For example, since FIG. 2 is drawn here in black-and-white, there are shown in rectangular brackets some demonstrative color names which may occupy the respective locations in such color-picking interface. Further shown, for demonstrative purposes, are types of airflows such as "gale" or "zephyr" or "wind" or "breeze", at their respective locations along the two axes.

Such user interface may enable the user to select, via a single tap or single click, the desired levels of both the Average rotation speed of the blades of the fan (or its rotor) and the Variance level of such rotation speed. The most-recent tap location or click location, or an indication of the current setting, may also be indicated or shown on the interface; for example, demonstrated in FIG. 2 by a small Triangle under the location of "Gale", indicating that the user has most-recently tapped or clicked the location indicated by that Triangle.

Each position or location within the circle represents a different "breeze" setting. The color picker may be oriented such that, for example, Red appears on the top, Blue on the right, Green on the bottom, and Orange/Yellow on the left; these correspond to stormy, steady, calm, and gusty types of breezes. Other suitable colors or arrangements may be used.

In some embodiments, a central area or central point of the interface may be white, corresponding to a random breeze setting in which the fan is commanded to randomly or pseudo-randomly determine and/or modify and/or select the average speed and/or the level of variance; or alternatively, in other implementations, corresponding to a setting of zero average speed and zero variance (e.g., shut-down or deactivation of the rotor). Other functions may be associated with a tap within the central region or at the central point of the circular interface.

In accordance with the present invention, the X-Y position that was tapped in the circle, is mapped into two variables: Average (or mean) Speed, and Variance, each one of them ranging within a pre-defined range of values (e.g., 0 to 100). The Average variable represents the average intensity of the breeze or the average speed of rotation of the blades; the Variance represents how much variability there is in the breeze or in the momentary speed of the blades.

Some embodiments may further utilize a third parameters, denoted T, which corresponds to the time length (e.g., in seconds) of the time-interval between two consecutive modifications of the rotation speed. In some embodiments, the value of parameter T may be fixed or hard-coded (e.g., may be fixedly equal to 15 seconds). In other embodiments, the value of parameter T may be read from a pre-defined lookup table of values, one value after the other; for example, T firstly being 10 seconds, then T being 14 seconds, then T being 8 seconds, then T being 19 seconds, and so forth; and optionally using a cyclic table such that the lookup table is re-used upon completion of reading it. In other embodiments, the value of T is selected randomly or pseudo-randomly from a pre-defined range (e.g., between 10 to 20 seconds), every time that T needs to be calculated and started; such that the first value of T may be randomly selected to be 14 seconds, the next value of T may be randomly selected to be 11 seconds, the next value of T may be randomly selected to be 19 seconds, and so forth.

In some embodiments, the value of T may be displayed to the user, and/or may be configured or modified or set by the user via a Time-Interval Length Modifier unit 122; for example, via a slider which enables the user to select the value of T within the range of 10 seconds to 25 seconds, and then such user-selected value of T is fixedly enforced and used. In some embodiments, even if the user selects a particular value for T, the system may still use small variations on that value, in order to ensure non-fixed time-intervals which may cause irritation to some users or which may be perceived as artificial by some alert users; for example, the user may select a value of T being 18 seconds, yet the system may randomly implement values of T that are plus or minus 3 seconds relative to that value (e.g., the system may randomly set the value of T, each time interval, to a random number in the range of 15 to 21 seconds). Other suitable methods may be used to set or modify the time-interval length.

Referring again to FIG. 1, fan 101 may accordingly include an Average rotation speed selector 115, and a Variance level selector 116, which may optionally be implemented via a Breeze-Parameters Selection Unit 117 (e.g., implemented as the circular interface of FIG. 2, or as the array or matrix of Table 1, or as two slider elements, or the like). The selection interface may be part of the RCU 105, or may be part of a wall-based or wall-mounted control panel of the fan, or may be implemented on a touch-screen of a smartphone or tablet or computer or smart-watch that controls the operational settings of the fan. Optionally, the parameter values may be selected via voice commands; for example, the user uttering the verbal phrase of "change ceiling fan breeze to Gale" or "set the fan speed to medium and its variance to maximum" or "change the fan speed variance to zero".

Based on the user-customizable parameters of Average speed and Variance, a rotation speed modifier 120 operates to set or modify the speed in which the blades turn (e.g., by adjusting or changing the rotation speed of the rotor). This may be performed continuously, or at pre-defined time intervals (e.g., every second, or every 2 second, or every T seconds when the parameter T is defined and enforced as described above). Optionally, a Time Interval Enforcer unit 121 may be responsible for setting or modifying the value of the time interval T, and/or for tracking the passage of time until the time-interval elapses and thus triggering the rotation speed modifier 120 to operate and change (if needed) the rotation speed of the rotor or blades.

In some embodiments, for each time interval, the fan may determine or may calculate a random or pseudo-random speed based on the user-defined or user-configured constraints of Average and Variance. In some embodiments, the values of these parameters may be inputs to a pseudo-random number generator, or, may be used to filter-out randomly-selected values that will cause the fan to breach the required constraints that were defined by the user. In some embodiments, the values of these parameters may be used to set the range of values, from which a single value is pseudo-randomly selected to be the rotation speed for the current or the upcoming time-interval.

In some embodiments, an Average and Variance Enforcer unit 123 may be implemented to ensure that the rotation speed of the rotor (or blades) is modified and re-modified in a way that complies with the constraints (Average parameter value; Variance parameter value; and optionally, Time-Interval length) that were defined or configured by the user; and to adjust or modify the rotation speed, for a pre-defined period of time (which may be shorter than T, or which may be longer than T) in order to adhere to these user-configured constraints. The Average and Variance Enforcer unit 123 may utilize a pseudo-random selection process which pseudo-randomly selects rotation speed values, every T seconds, or every T/M seconds (wherein M>1), and discards a randomly-selected value that causes deviation from the user-configured constraints, and keeps and utilizes a randomly-selected value that maintains compliance with the Average and Variance parameters defined by the user.

For example, the user may turn-on the fan, and immediately set the Average rotation speed to "3 out of 5", and the Variance level to "2 out of 5". In such scenario, the Average and Variance Enforcer unit 123 may commence by randomly selecting a rotation speed value in the range of 2 to 4, and may enforce it for a time-interval T of ten seconds. For example, the speed level of 2 out of 5 was selected, and is enforced for 10 seconds. Then, the Average and Variance Enforcer unit 123 detects that its next selected speed level should be higher, in order to bring the Average speed (currently level 2) closer to the level requested by the user (level 3). Therefore, towards the end of the initial ten-second time interval, the Average and Variance Enforcer unit 123 selects randomly a new speed value, but this time not in the range of 2 to 4, but rather, only in the smaller range of 3 to 4; and enforces it for ten additional seconds. In an example, the value of "3" was selected and enforced. The average speed so far in those 20 seconds is 2.5, and therefore the Average and Variance Enforcer unit 123 would again select randomly a new speed level in the range of 3 to 4; or, in some implementations, would enforce deterministically a time-interval of 8 seconds with speed of 4, in order to bring the average speed closer to the Average parameter configured by the user. It is noted that the Average and Variance Enforcer unit 123 does not select a speed level of 1, or a speed level of 5, neither deterministically nor randomly, since those speed level values do not comply with the relatively-low level of Variance that the user had defined. The Average and Variance Enforcer unit 123 may thus continue to operate based on a set of pre-defined rules or conditions, optionally utilizing pseudo-random values when possible, or utilizing deterministic calculations, in order to cause an increase or a decrease in the Average rotation speed in the most-recent N seconds (e.g., the most recent 180 or 300 seconds; or a moving time-window of 240 seconds; or the like), while also maintaining Variance within the constraints defined by the user.

The Applicants have realized that an increase in rotation speed of the blades may be easily implemented, whereas a decrease in rotation speed of the blades may be more difficult for implementing and/or may require a use of a delay period. For example, in some implementations, an increase in the rotation speed may be effected immediately, by commanding the rotor to revolve faster. However, a decrease from high-speed rotation to low-speed rotation may take several seconds, as even if the rotor revolution speed is reduced instantly or is entirely deactivated, the blades continue to speed at their initial high speed for several more seconds and only gradually would slow down due to air friction. Accordingly, in some embodiments, as the fan takes more time to spin down than to spin up, the length of the time-interval may be averaged out, and the user may experience a speed that may have small variations from the desired setting, rather than the natural gustiness that might be expected in some situations.

Therefore, some embodiments may utilize a Spin-Down Compensation/Correcting Unit 124, having a correction mechanism or a compensating mechanism to take into account such delays in response by the blades (which may be measured or calibrated or may be hard-coded into the fan logic circuitry), and may intentionally prolong the time-interval for a spinning-down operation since such spinning-down may take a few additional seconds to actually reflect at the blades. For example, the Spin-Down Compensation/Correcting Unit 124 may enforce a rule that a decrease in the rotation speed of the blade, which is supposed to be enforced for a time interval of T seconds, would actually be enforced for a time-interval of 1.2 T or 1.5 T, since a spin-down or a speed-reduction may have a delay.

Some embodiments may further utilize a Forced Stillness unit 125, which may enforce time period(s) of stillness or of very light breeze, optionally punctuated by brief gusts of high-speed or medium-speed rotation of the breeze; thereby emulating or simulating a natural breeze. This may be implemented via a lookup table that pre-defines time-intervals and their respective rotation speeds, rather than by implementing a random selection of values; as past speed levels need to be taken into account to achieve such emulation or simulation of natural breeze conditions.

Some embodiments may define the breeze settings by utilizing an n-order Markov chain; having states corresponding to the discrete rotation speed values that are supported by the fan; and having transition probabilities that are determined by the Average and the Variance parameters in a way that achieves the desired intensity and variability of the breeze as set by the user; thereby providing a natural seeming breeze that closely emulates or closely simulates a naturally-occurring breeze. In some embodiments, the parameters for such Markov chain may optionally be defined by taking into account real-life meteorological data that corresponds to such breeze conditions. Such Markov chain construction, updating and utilization may be performed by a Markov Chain Management Unit 126, or other dedicated unit. It is noted that the utilization of a Markov chain, in the context of operating a smart fan or ceiling fan, and/or in the context of (or for the purpose of) modifying the rotation speed of blades of a fan or ceiling fan, and/or for the purpose of emulating or simulating a naturally-occurring breeze or airflow via an electric fan, is a novel and inventive feature that was never done in conventional fans or ceiling fans.

In some embodiments, some or all of the modules or units described, may optionally be implemented as part of a Logic Controller 127, which may be coupled to rotor 103, or may be otherwise comprised in fan 101. In some embodiments, such Logic Controller 127 may optionally be implemented as part of the RCU 105 and/or the Control Panel 108, or may even be implemented via the smartphone or tablet (or other electronic device) that is utilized to control the fan 101: such Logic Controller 127 may perform such calculations locally within the fan 101; or remotely in such other device (or even in the HAP 114 ) which may then transmit or convey to the fan 101 the actual modifications to be executed by the rotor 103.

In some embodiments, fan 101 and/or system 100 may optionally comprise a Rounds Per Minute (RPM) Sensor/Monitor 128, able to sense or track or monitor the actual RPM performance of the blades 102, and able to provide such information in real-time or in near-real-time (e.g., every 5 seconds, every 10 seconds) to one or more components of the system (e.g., within fan 101, or in RCU 105 or control panel 108 or to the HAP 114) as a feedback loop or a closed-loop which may be utilized by the system (e.g., by Logic Controller 127) to further adjust or modify or fine-tune the rotation speed and/or the time-interval length. For example, such sensor or monitor may be integrated in fan 101, or may be coupled to or may be adjacent to the rotor 103 or the blades 102; or may be mounted on the blades 102; or may be a mechanical switch or a mechanical sensor such that each complete 360 degrees revolution of the blades causes a pin to move and to count an additional revolution; or may be implemented as an optical sensor which tracks via an imager or a camera one of the blades (e.g., having a unique visual mark thereon); or may otherwise be implemented to count the revolutions of the blades. The actual RPM data collected by such sensor or monitor, may be taken into account by the Spin-Down Compensation/Correcting Unit 124, or by the Average and Variance Enforcer 123, or by the Time-Interval Length Modifier 122, or by the Logic Controller 127, or by other components of the system 100, to further adjust or modify the rotation speed; thereby enabling the system to compensate for mechanical imperfections, for air friction, for mechanical friction of components, for performance degradation of mechanical components, for a situation in which one or more of the blades is broken or is damaged or is replaced or repaired, or the like. This enables the system to use the real time RPM revolution data to maintain the desired breeze profile, regardless of the type of blades attached to the fan, their current mechanical condition, environmental conditions, or product aging or defects. This closed-loop control and adjustment process may thus achieve a more reliable and more consistent natural breeze effect.

In some embodiments, system 100 and/or fan 101 may optionally comprise a Live Breeze Unit 128, which may cause the fan 101 to operate in a particular relation (e.g., correlation, or inverse relation) to the actual weather that is experienced at (or outside, or near) the venue in which the fan 101 is installed. For example, system 101 may comprise a Global Positioning System (GPS) element or other location-detecting component, which enables fan 101 and/or RCU 105 and/or control panel 108 and/or smartphone 118 and/or tablet 119 to determine the geo-spatial location; and which further enables such device to obtain real-time or near-real-time meteorological data from an Internet-connected weather sensor or weather server or website or other weather data transmitter. In some embodiments, the geo-spatial location of the fan 101 may be hard-coded or manually configured one time, during the initial installation of fan 101, and such GPS or location detection may not be needed; for example, by indicating manually, one time, to system 100 (e.g., via the HAP account) that Fan 101 is located in "Cresskill, N.J., USA". From that initial setting and onward, system 100 and/or fan 101 and/or other component of the system, may obtain current weather data, and may take it into account to configure the rotation speed of fan 101. In a first example, the user of fan 101 may instruct it to generate breeze that imitates the current wind conditions outside the venue; accordingly, if the current weather conditions are stormy and gusty, then fan 101 would automatically enforce a speed rotation scheme that provides a similar airflow within the venue; thereby providing an in-venue artificial breeze that correlates to, or is in direct relation to, the dynamically-changing wind conditions immediately outside that venue. In a second example, the user may conversely command the system, to generate an in-venue breeze that is inversely related to the outside wind conditions; such that an outside calm weather would trigger an indoor stormy/windy airflow by the fan, or such that an outdoor stormy and windy weather would trigger a slow and steady blades rotation indoor. In a third example, the user may command the system to implement an airflow pattern that mimics or follows the current weather conditions in a different location, thereby enabling a user who lives in Miami to command its indoor fan to mimic or follow the current weather condition in Boston; and the system may obtain or fetch or download real-time or near-real-time weather data about the remote location (Boston) and implement a corresponding indoor airflow within the fanned venue (in Miami). In some embodiments, optionally, the HAP account of the user may further include a local weather sensor or weather monitoring unit, which may be placed at or outside the venue (e.g., in the back yard), and which may provide to the system real-time weather data; which may be taken into account in order to mimic a similar airflow within the venue, or conversely in order to trigger an inversely-related airflow within the venue.

Some embodiments may provide energy savings and energy cost reduction to the user or tenant or home-owner. For example, for some users that utilize the natural breeze emulation of the present invention, the perceived level of cooling is greater than that achieved via a conventional fan using the same amount of electricity to drive the fan at a constant speed, in at least some implementations.

In some embodiments, fan 101 or its rotor 103 may be powered by a Direct Current (DC) power source, rather than by an Alternating Current (AC) power source. Still, fan 101 may be configured, in accordance with the present invention, to provide a continuously variable breeze effect, even when powered by DC power. For example, even though the user may only see a fixed number of speeds (e.g., six fixed speeds, from 0 to 5), a fan rotor controller 129 may be capable of producing and enforcing a nearly continuous range of speeds (e.g., 1,024 different discrete speed values). In such case, instead of utilizing a Time Interval in the order of magnitude of (for example) 10 or 15 or 20 seconds, the system may utilize a Time Interval in the order of magnitude of Sub-1-Second (e.g., 200 or 300 or 500 or 800 milliseconds), and may optionally change from utilizing a Markov Chain based model of speed change to a model that reflects Brownian motion or leaping motion (e.g., similar to random motion of particles that are suspended in a fluid). The Brownian motion algorithm simulates a breeze by randomly or pseudo-randomly modifying the rotation speed value, upwardly or downwardly, at each such sub-second time interval. Optionally, a bias (e.g., a biasing value or biasing component) may also be applied to these values based on the current rotation speed in order to comply with the user-configured Average parameter value; and the time-length of the Time Interval may be adjusted or modified (e.g., prolonged or shortened) in a dynamic manner to change the level of gustiness and comply with the user-configured Variance parameter value. Such modifications may be implemented or managed by a Brownian Motion Management Unit 135, or by another component of the system (e.g., by Logic Controller 127). It is noted that the utilization of a Brownian motion model, in the context of operating a smart fan or ceiling fan, and/or in the context of (or for the purpose of) modifying the rotation speed of blades of a fan or ceiling fan, and/or for the purpose of emulating or simulating a naturally-occurring breeze or airflow via an electric fan, is a novel and inventive feature that was never done in conventional fans or ceiling fans.

In some embodiments, for an Internet-connected fan, the user may turn on and turn off the Natural Breeze emulation function of the fan by using a "Natural Breeze Emulation" button or GUI element or UI element, which may be part of the RCU 105 or the control panel 108, or which may be an on-screen GUI element that the user may engage through his smartphone or tablet or other device.

In other embodiments, the system may be configured to monitor or to listen to (or to intercept) a wireless communication signal, which indicates that the user has clicked on a "breeze" button on the proprietary RCU 105 of the fan 101; to deduce from such signal that the user is interested in natural breeze emulation; and to command the fan 101, via other wireless communication signals, to operate in accordance with the natural breeze emulation scheme of the present invention, instead of implementing a factory-defined "breeze" function which repeatedly changes the rotation speed in a predicted manner. Upon such interception, the system may further present to the user the two-dimensional selection interface, enabling the user to customize or configure the particular parameters of such breeze emulation (e.g., Average rotation speed; Variance level; and optionally, the Time-Interval length), and then enforcing such user-configured breeze emulation via wireless communication signals transmitted to fan 101.

Some embodiments may include a non-transitory storage medium or storage article having stored thereon instructions or code that, when executed by a machine or a hardware processor, cause such machine or hardware processor to perform a method as described.

Some implementations may utilize an automated method or automated process, or a machine-implemented method or process, or as a semi-automated or partially-automated method or process, or as a set of steps or operations which may be executed or performed by a computer or machine or system or other device.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "generating", "determining", "establishing", "analyzing", "checking", "detecting", "measuring", or the like, may refer to operation (s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some implementations may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some implementations may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some implementations may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device. The implementation may also comprise a plug-in or extension or add-on or a software patch or a software update or a software modification to an existing design software (such as Adobe Photoshop) or to a workflow software (such as Workfront), to allow users to efficiently and rapidly access the system of the present without leaving their operational environment and/or from within such software or application, and to allow.

Functions, operations, components and/or features described herein with reference to one or more implementations, may be combined with, or may be utilized in combination with, one or more other functions, operations, components and/or features described herein with reference to one or more other implementations. Some embodiments may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. A fan comprising:
an electric rotor to rotate a set of blades at a rotation speed;
a controller to enforce a modification to rotation speed of the set of blades, based on
(i) a first user-configurable parameter of average rotation speed to be maintained, and
(ii) a second user-configurable parameter of level of variance of rotation speed.

2. The fan of claim 1,
wherein the controller is to enforce said modification based also on (iii) a third user-configurable parameter of length of time-interval between two consecutive modifications of rotation speed.

3. The fan of claim 1, further comprising:
a wireless communication receiver to receive, directly from a co-located wireless remote-control unit, a wireless communication signal indicating a local user selection of values for said first parameter and for said second parameter.

4. The fan of claim 1, further comprising:
a wireless communication receiver to receive, via an Internet-connected home automation platform, a wireless communication signal indicating a remote user selection of values for said first parameter and for said second parameter.

5. The fan of claim 1,
wherein a value of said first parameter and a value of said second parameters are obtained via a single tap on a two-dimensional representation of values.

6. The fan of claim 1,
wherein said controller enforces the modification to rotation speed of the blades by using a Markov chain management unit which utilizes a Markov chain (i) having states corresponding to discrete rotation speed values that are supported by the fan, and (ii) having transition probabilities that are determined based on the value of the first parameter and the value of the second parameter.

7. The fan of claim 1,
wherein said controller enforces the modification to rotation speed of the blades by using a Brownian motion management unit which utilizes a Brownian model to modify said rotation speed while enforcing compliance with said first parameter and with said second parameter.

8. The fan of claim 1,
wherein said controller enforces the modification via an Average and Variance enforcer unit, which enforces an average rotation speed of said set of blades based on said first parameter, and which enforces a variance of change of the rotation speed of said set of blades based on said second parameter.

9. The fan of claim 8,
wherein said Average and Variance enforcer unit is to modify said rotation speed at particular time-points, calculated based on a user-configurable time interval, to enforce compliance of the rotation speed with said first parameter and with said second parameter.

10. The fan of claim 1,
wherein said controller operates to enforce multiple modifications to said rotation speed that emulate a non-predictable non-repeated naturally-occurring breeze.

11. The fan of claim 1,
wherein said controller operates to enforce multiple modifications to said rotation speed that emulate a current real-time wind condition at a particular geo-spatial location, based on real-time weather information related to said particular geo-spatial location.

12. The fan of claim 1, further comprising:
a spin-down compensating unit, to further enforce a modification of the rotation speed based on an estimation that a spin-down of said blades is slower to effect relative to a spin-up of said blades.

13. The fan of claim 1, further comprising:
a Rounds-Per-Minute (RPM) monitor, to monitor an actual RPM rotation frequency of said set of blades;
a compensating unit to enforce an additional modification of the rotation speed based to compensate for mechanical friction and imperfections of said set of blades.

14. The fan of claim 1,
wherein said fan receives wirelessly from a smartphone or a tablet of a user, via a home automation platform, a command indicating user-configured values of said first parameter and of said second parameter.

15. The fan of claim 1,
wherein said fan receives wirelessly from a smartphone or a tablet of a user, via a home automation platform, an indication of a user-selection through an on-screen color-picker interface, representing command indicating user-configured values of said first parameter and of said second parameter.

16. The fan of claim 1,
wherein said controller determines which rotation speed modification to enforce, by pseudo-randomly selecting a new rotation speed from a range of values, wherein the range of values is dynamically defined to ensure compliance of the rotation speed with said first parameter and with said second parameters as configured by said user.

17. The fan of claim 1,
wherein said controller enforces a speed rotation scheme which emulates a wind pattern that is characterized cumulatively (I) by a first airflow characteristic indicating a value in a range between calm airflow and stormy airflow and (II) by a second airflow characteristic indicating a value in a range between steady airflow and gusty airflow.

18. The fan of claim 1,
wherein said controller enforces a speed rotation scheme which emulates a wind pattern that is user-selectable among at least (i) a calm and steady airflow, (ii) a calm and gusty airflow, (iii) a stormy and steady airflow, (iv) a stormy and gusty airflow.

19. The fan of claim 1,
wherein said fan is a smart ceiling fan that communicates wirelessly with a home automation hub.

20. A method comprising:
electrically rotating a rotor connected to a set of blades, at a rotation speed;
automatically modifying said rotation speed, based on (i) a first user-configurable parameter of average rotation speed to be maintained, and (ii) a second user-configurable parameter of level of variance of rotation speed;
wherein the method is implemented by utilizing at least a hardware-based control unit.

* * * * *